Patented Jan. 9, 1951

2,537,023

UNITED STATES PATENT OFFICE 2,537,023

INSECT REPELLENTS

Paul D. Bartlett, Weston, Mass., and Abraham Schneider, Philadelphia, Pa., assignors to the United States of America as represented by the Secretary of the Army No Drawing. Application January 7, 1949, Serial No. 69,836

7 Claims. (Cl. 167—30)

This invention relates to insect repellents.

We have found that the application of certain unsubstituted or substituted indanols to the human skin or to the fabric affords effective protection against insect bites by repelling insects, particularly *Aedes aegypti* and *Anopheles quadrimaculatus*.

A number of tests to measure the repellency of these compounds against *Aedes aegypti* and *Anopheles quadrimaculatus* was conducted by smearing the compound on the arms of test personnel, who then thrust their arms into cages containing *Aedes aegypti*. The arms were exposed for 30-minute intervals at 3 minutes each until the first insect bite.

Tests to measure the repellency against *Aedes aegypti* of fabrics impregnated with these compounds were conducted by uniformly impregnating mercerized cotton hose with the compound at a rate equivalent to 3.3 gms. per sq. ft., drawing the dried hose over the arms of test personnel, who then thrust their covered arms into cages containing *Aedes aegypti* for 1 to 2 minutes. If no bites or less than 5 bites were received, the tests were repeated each successive day until 5 or more bites during one exposure were received.

Among the indanols possessing insect repellent properties are alpha-indanol, beta-indanol, and their methoxy and acetoxy substituents.

The following table illustrates the insect repellency conferred by four typical compounds contemplated by our invention:

|  | Repellency on Application to Skin | | Repellency of Impregnated Fabric Against *Aedes aegypti* |
|---|---|---|---|
|  | *Aedes aegypti* | *Anopheles quadrimaculatus* |  |
| Alpha-indanol [1] |  |  | 1 to 5 days. |
| 2-acetoxy-alpha-indanol [2] |  |  | at least 15 days. |
| Beta-indanol [3] |  |  | Do. |
| 1-methoxy-beta-indanol [4] | 232 min. | 45 min. | over 10 days. |

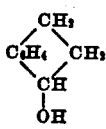

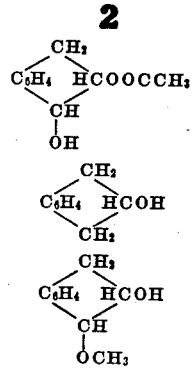

For ease of application the substituted or unsubstituted indanols contemplated by the present invention may be incorporated in a suitable inert liquid or solid carrier such as mineral oil, alcohol, petrolatum, etc. For facile and uniform fabric impregnation, they may be applied in an inert solvent, such as alcohol, ether, etc.

Having thus described our invention, we claim:

1. An insect repellent fabric impregnated with a substance being a member of the group consisting of indanol, acetoxy indanol, and methoxy indanol.
2. An insect repellent fabric impregnated with indanol.
3. An insect repellent fabric impregnated with beta indanol.
4. An insect repellent fabric impregnated with 2-acetoxy-alpha-indanol.
5. An insect repellent fabric impregnated with methoxy indanol.
6. An insect repellent fabric impregnated with 1-methoxy-beta-indanol.
7. A composition for imparting insect repellency to a region from which the insects are to be repelled, said composition comprising methoxy-beta-indanol in an inert non-gaseous organic applicator.

PAUL D. BARTLETT.
ABRAHAM SCHNEIDER.

REFERENCES CITED

The following references are of record in the file of this patent:

Beilstein: "Handbuch d. Org. Che.," 4th ed., vol. 6, pages 574, 575; vol. 6, first supplement, page 286; vol. 6, page 970.